(12) United States Patent
Stevens et al.

(10) Patent No.: US 8,239,453 B2
(45) Date of Patent: Aug. 7, 2012

(54) SYSTEM AND METHOD FOR PROVIDING ONE CLASS OF USERS OF AN APPLICATION A VIEW OF WHAT ANOTHER CLASS OF USERS OF THE APPLICATION IS VISUALLY EXPERIENCING

(75) Inventors: Jeremy Max Stevens, Seattle, WA (US); Kanchan Mitra, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1890 days.

(21) Appl. No.: 11/067,605

(22) Filed: Feb. 25, 2005

(65) Prior Publication Data

US 2006/0195520 A1 Aug. 31, 2006

(51) Int. Cl.
*G06F 15/16* (2006.01)
(52) U.S. Cl. ......................................... 709/204
(58) Field of Classification Search .................. 709/204, 709/205, 206
See application file for complete search history.

(56) References Cited

U.S. PATENT DOCUMENTS

| | | | | | |
|---|---|---|---|---|---|
| 6,097,442 | A | * | 8/2000 | Rumreich et al. | 348/563 |
| 6,144,991 | A | * | 11/2000 | England | 709/205 |
| 7,216,302 | B2 | * | 5/2007 | Rodden et al. | 715/815 |
| 7,526,525 | B2 | * | 4/2009 | Hagale et al. | 709/204 |
| 7,895,070 | B2 | * | 2/2011 | Das et al. | 705/7.13 |
| 2003/0131057 | A1 | * | 7/2003 | Basson et al. | 709/206 |
| 2003/0142122 | A1 | * | 7/2003 | Straut et al. | 345/704 |
| 2003/0145071 | A1 | * | 7/2003 | Straut et al. | 709/223 |
| 2004/0024636 | A1 | * | 2/2004 | Jaffe et al. | 705/14 |
| 2004/0221010 | A1 | * | 11/2004 | Butler | 709/204 |
| 2005/0177385 | A1 | * | 8/2005 | Hull et al. | 705/1 |
| 2005/0264648 | A1 | * | 12/2005 | Ivashin et al. | 348/14.09 |
| 2006/0184578 | A1 | * | 8/2006 | La Rotonda et al. | 707/104.1 |
| 2009/0018903 | A1 | * | 1/2009 | Iyer | 705/14 |

FOREIGN PATENT DOCUMENTS

EP 0 898 424 2/1999

OTHER PUBLICATIONS

Siddiqui, Mansoor; "Web Services Security in the .NET Framework"; Apr. 13, 2002; pp. 1-20.*
Phipps, S., "IBM Person to Person / 2 Desktop Conferencing—Unlocking Your Investment," Proceedings of Share Europe Spring Conference, 1993.
European Patent Search Report for European Patent Application No. EP 06 10 0375, Microsoft Corporation, Jun. 9, 2006.

* cited by examiner

*Primary Examiner* — Jeffrey Nickerson
(74) *Attorney, Agent, or Firm* — Perkins Coie LLP

(57) ABSTRACT

A technique for providing one class of users of an application a view of what a typical user in another class of users of the same application is visually experiencing. A client application that is interacting with the application provides a user an option of having a PIP view of what a typical user in one of the other classes of users supported by the application is visually experiencing. When the user requests to display a PIP view that represents what a typical user in a specified one of the other classes of users of the same application is seeing, a PIP view window is automatically rendered on the user's display screen. The PIP view window represents what a typical user in the specified one of the other classes of users is seeing, but is not an "active" interface through which the user can interact with the application.

18 Claims, 5 Drawing Sheets

SYSTEM AND METHOD FOR PROVIDING ONE CLASS OF USERS OF AN APPLICATION A VIEW OF WHAT ANOTHER CLASS OF USERS OF THE APPLICATION IS VISUALLY EXPERIENCING

TECHNICAL FIELD

The described technology is directed generally to application programs that provide different user interfaces to different classes of users and, more particularly, to providing one class of users a view of what another class of users is visually experiencing.

BACKGROUND

With the proliferation of computers and the advent of the Internet, and in particular, the maturing of the World Wide Web ("web"), real-time conversations between conversation participants via their computer systems are becoming increasingly common. These conversations, which take place virtually over computer networks, are ever replacing the traditional face-to-face meetings.

Collaboration applications, such as MICROSOFT LIVE MEETING, are increasingly being used to conduct these virtual meetings between potentially geographically distributed people. For example, a meeting organizer can schedule a meeting with a collaboration service server, and provide a list of meeting participants. The meeting organizer then invites the participants to attend the scheduled meeting by sending those people invitations. The invitation contains privileged information, such as a meeting time, meeting location—i.e., a universal resource locator (URL), meeting identifier, and meeting password, the participant will need to attend the meeting.

These collaboration applications typically provide for multiple classes of participants. For example, one class of participants in a virtual meeting may be "presenters," while another class of participants may be "attendees." The classes of participants may be distinguished based on permissions, with presenters having permission to perform additional or more functionality during the meeting than attendees. To provide the different permissions, the collaboration application usually provides presenters with a different application view—user interface (UI)—than the application view that is provided to attendees.

One problem with providing different desktops to different classes of participants is that one class of participants, for example, presenters, often are not provided good feedback regarding the other classes of participants, for example, attendees, are seeing. For example, during the virtual meeting experience, attendees may not have permission to see all of the UI components that are available in a meeting to presenters. Thus, during voice conversations conducted in conjunction with the meeting, presenters may not know exactly what an attendee is able to see, and may get confused about what attendees can actually do.

Another problem arises where a view of a participant's desktop or a portion of the desktop is shared with the other participants in a collaboration session. For example, application sharing allows a specific presenter—e.g., host—to share some portion of his or her screen with the other participants in the meeting. The image that is being shared is made available via a connection, typically through a computer network, to the other participants' computer screens. Because the image that is being shared is made available by transmission from the application sharing host's computer to the other participants' computers, typically over a network, issues such as network transmission latencies and/or slowdowns and the difference in computer performance may cause some or all of the participants of the meeting to fall significantly behind what is being displayed to the host of the application sharing session. Thus, the presenter who is hosting the application sharing session has difficulty knowing what the other participants in the meeting are seeing.

It would be desirable to have a technique that allows one class of participants—i.e., presenters—in a collaboration session to have a view of what another class of participants—i.e., attendees—is visually experiencing during the collaboration session.

DETAILED DESCRIPTION

Figure 1:
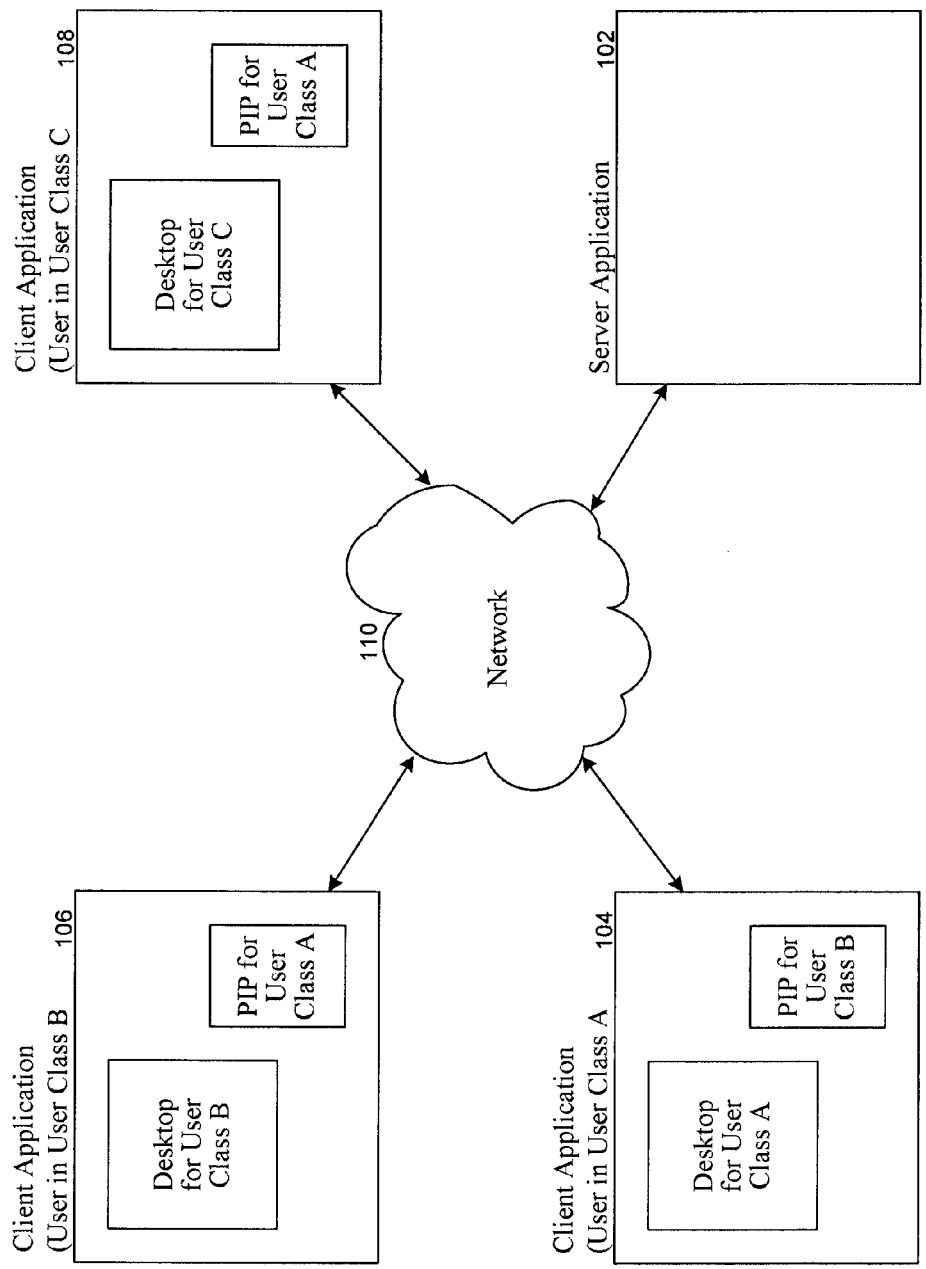
FIG. 1 is a high-level block diagram illustrating an environment in which the described techniques may operate.

A method and system for providing one class of users of an application a view (referred to herein as a picture-in-picture (PIP) view) of what a typical user in another class of users of the same application is visually experiencing is provided. In one embodiment, an application that supports multiple classes of users provides users in one class an option to display on the users' computing device display screen a PIP view that mimics what users in another class are currently seeing. The application is one where the classes of users are in communication with each other through the application, such as a collaboration application. The application may provide different application graphical user interfaces (GUIs) or desktops based on the user class. The term "desktop" refers to the collection of one or more windows or frames which are generated/produced/provided by the application. For example, the application may require a user to provide credentials, such as a user identification and a password, and, based on the provided credentials, assign the user to one of the supported classes of users and present the user a desktop appropriate for the assigned class of users.

Although the techniques for providing users of an application in one class a PIP view that mimics what users of the application in another class are currently experiencing are further disclosed in conjunction with the operation of a collaboration server application and a collaboration client application, one skilled in the art will appreciate that the described techniques may readily be applied to any application that supports multiple classes of users. One skilled in the art will also appreciate that the described techniques may be readily applied to applications outside of the client-server paradigm. For example, an application may provide different user interfaces depending on the class of user, and the user interfaces may include the pseudo client component or the loopback component which are discussed further below.

In one embodiment, a collaboration server application provides users in one class an option to display on the user's display screen a PIP view that mimics what users in another class are currently seeing. For example, the collaboration server application may support classes of users, such as participants and attendees, and the collaboration server application may provide the presenters in a collaboration session an option of displaying on the presenter's display screen a PIP view that mimics what the attendees in the collaboration session are currently seeing. The PIP view mimics what a typical attendees' visual experience would be, and is not a replica of an actual attendee's desktop. In other embodiments, the collaboration server application may also provide attendees in a collaboration session an option of displaying on the attendees' display screen a PIP view that mimics what the presenters or another class of users in the collaboration session are currently seeing.

In one embodiment, when a user executes a collaboration client application on a computing device and registers with the collaboration server application as, for example, a presenter in a collaboration session, the collaboration server application may download a pseudo client component onto the presenter's computing device. In another embodiment, a pseudo client component may be included in the collaboration client application. When the presenter in the collaboration session requests the PIP view, the pseudo client component automatically establishes a new, second connection—i.e., communication channel—to the collaboration server application and requests to join the collaboration session as an attendee. Upon establishing the connection, the collaboration server application treats the pseudo client component as just another attendee in the collaboration session and begins sending the collaboration session metadata to the pseudo client component. The pseudo client component receives the metadata and processes the metadata as if the processing is occurring on an attendee's computing device and renders the metadata into a window, which is displayed on the presenter's display screen. In one embodiment, the data displayed in the panels and subwindows of the window may be a representation of the data that is actually displayed at a typical attendee's desktop. For example, a "Question & Answer" panel in the PIP display may display snippets of the questions that are being answered. Alternatively, the Question & Answer panel may display only questions that are directed to all the attendees. In another example, an application sharing subwindow of the window may display a representation of the scaling of the subwindow and not display the contents of the application that is being shared.

If the collaboration application supports more than two classes of users—i.e., classes of users other than presenters and attendees—the presenter may be provided an option to specify the class of users for which the PIP view is desired, and the pseudo client component can establish a new, second connection to the collaboration server application and request to join the collaboration session as a member of the specified class. Upon establishing the connection, the collaboration server application treats the pseudo client component as just another member of the specified class in the collaboration session and begins sending the collaboration session metadata to the pseudo client component. The pseudo client component receives the metadata and processes the metadata as if the processing is occurring on a specified member's computing device and renders the metadata into a window, which is displayed on the presenter's display screen.

In another embodiment, a collaboration client application includes a pseudo client component and an application loopback component. When a presenter in a collaboration session requests the PIP view, the application loopback component listens for events going from the collaboration client application to the collaboration server application. The application loopback component makes a copy of the data associated with an outgoing event and sends the data to the pseudo client component. Upon receiving the data from the application loopback component, the pseudo client component processes the data as if the pseudo client component is an attendee in the collaboration session. The pseudo client component mimics the processing that would occur on an attendee's desktop and renders a window that represents the attendee's desktop on the presenter's display screen. One skilled in the art will appreciate that the application loopback component and/or the pseudo client component may be downloaded by the collaboration server application onto a users computing device when the user registers with the collaboration server application as a presenter in a collaboration session.

In one embodiment, an application that supports three or more classes of users may provide users in one class an option to select a class and thus, display as part of the user's desktop a PIP view that mimics what users in the selected class are currently seeing. For example, an application that supports three classes of users, A, B, and C, may provide a user in class A an option to select either class B or C, and thus, view what a typical user in either class B or class C is seeing. Likewise, the application may allow a user in class B an option to select either class A or C, and a user in class C an option to select either class A or B.

One technical advantage to providing a presenter in a collaboration session a view of what a typical attendee is currently seeing is that the presenter would know what effect his or her actions would have on the visual experience of the other participants in the collaboration session. For example, if the view of what the typical attendee is currently seeing is slow, this may serve as an indication to the presenter to slow down. Thus, the presenter is provided an improved user experience than if the presenter was not provided the option to view what a typical attendee is currently seeing.

The various embodiments of the described techniques and their advantages are best understood by referring to FIGS. 1-5 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a high-level block diagram illustrating an environment in which the described techniques may operate. As depicted, the environment comprises a server application 102 coupled to client applications 104-108 through a network 110. The server application provides different desktops to different classes of users and allows the classes of users to use the provided GUIs to communicate with each other through the server application. The server application provides one or more classes of users of the server application an option to have displayed on their display screen a PIP view of what a typical user in one of the other classes of users of the server application is visually experiencing. The PIP view mimics the desktop that the server application generates for a typical user in the selected one of the other classes of users. The client applications are applications that provide connectivity and access to the server application, and rely on the server application to perform some operations. Users use the client application to connect to and utilize the services provided by the server application.

By way of example, the server application may support three classes of users, A, B, and C, and may provide users in each of the three classes a different desktop for use in interacting with the other users through the server application. In FIG. 1, a user who belongs to user class A ("user A") may be using client application 104, a user who belongs to user class B ("user B") may be using client application client 106, and a user who belongs to user class C ("user C") may be using client application client 108 to each access the services provided by the server application. Accordingly, the server application may cause each of the client applications to display a desktop that is appropriate for the respective user class. For example, user A's client application displays a desktop that the server application provides to users in user class A on user A's display screen. Similarly, user B's and user C's client applications each display a desktop that the server application provides to users in user class B and C, respectively, one user B's and user C's respective display screens. Each of the users, user A, User B, and user C, can select an option to display on the user's display screen a PIP view of what a typical user in the other classes of users is seeing. For example, user A may have an option of displaying a PIP view of what a typical user in either user class B or user class C is seeing, user B may have an option of displaying a PIP view of what a typical user in either user class A or user class C is seeing, and user C may have an option of displaying a PIP view of what a typical user in either user class A or user class B is seeing. In the environment depicted in FIG. 1, user A chose to display a PIP view of what a typical user in user class B is seeing, and user B and user C each chose to display a PIP view of what a typical user in user class A is seeing.

In other embodiments, the server application may allow users to display a PIP view of what a typical user in one of the user classes is experiencing based on user access rights or levels. Using access rights, the server application may provide a user an option to only display a PIP view of what a typical user in user class that has less or lower rights than the user's user class. For example, assuming that users in user class A are at a higher access level than users in user class B who in turn are at a higher access level than users in user class C, the server application may allow users in user class A to display a PIP view of what a typical user in user class B or C is viewing, but only allow users in user class B to display a PIP view of what a typical user in user class C is viewing, and not allow users in user class C to display a PIP view.

The network is a communications link that facilitates the transfer of electronic content between, for example, the attached computers. In one embodiment, the network includes the Internet. It will be appreciated that the network may be comprised of one or more other types of networks, such as a local area network, a wide area network, a point-to-point dial-up connection, and the like. It will also be appreciated that the network may not be present. For example, client applications and the server application may both reside on the same computing system and communicate via communication mechanisms, such as, interprocess communication, remote function call, internal communication buses, etc., typically supported on the computing system.

The computer systems on which the server application, the client application, and other components described herein can execute may include a central processing unit, memory, input devices (e.g., keyboard and pointing devices), output devices (e.g., display devices), and storage devices (e.g., disk drives). The memory and storage devices are computer-readable media that may contain instructions that implement the server application, client application, and other components. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the described techniques may be implemented in various operating environments that include personal computers, server computers, computing devices, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The techniques may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
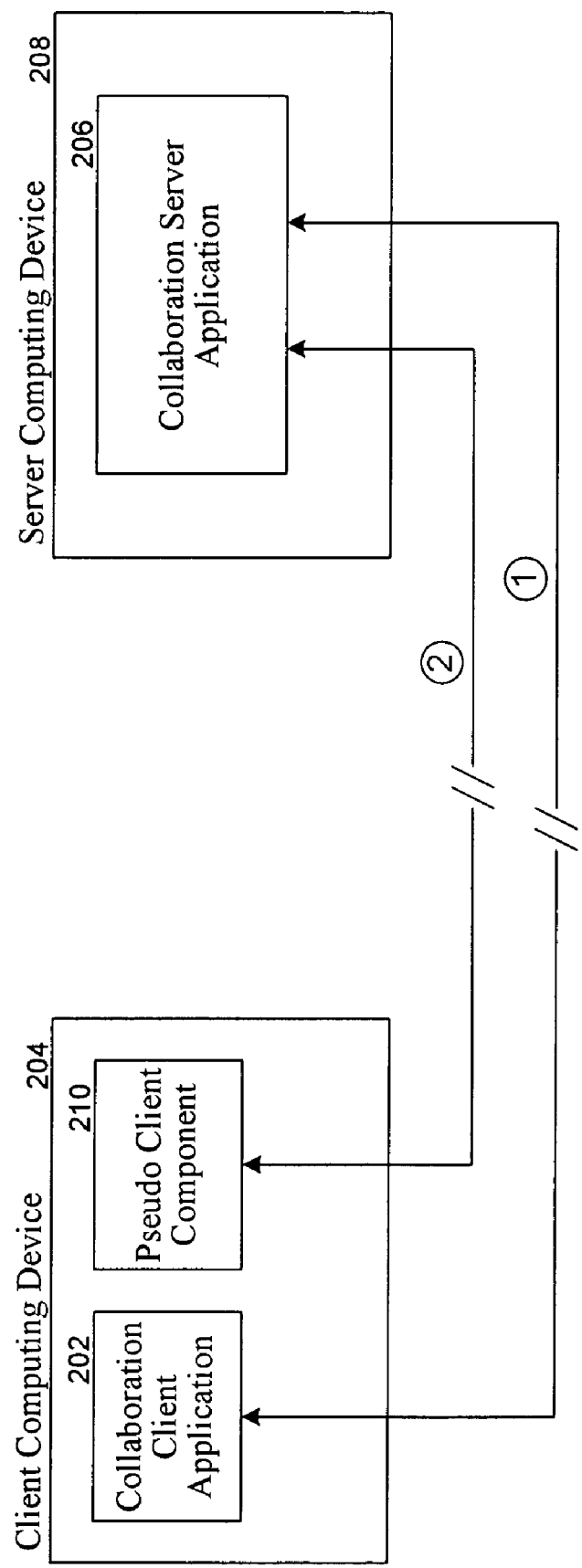
FIG. 2 is a block diagram illustrating an example flow of information between a collaboration client application, a pseudo client component, and a collaboration server application, according to one embodiment.

FIG. 2 is a block diagram illustrating an example flow of information between a collaboration client application, a pseudo client component, and a collaboration server application, according to one embodiment. By way of example, the collaboration server application may support two classes of users, "presenters" and "attendees," and may allow the presenters to display a PIP view of what a typical attendee is visually experiencing. In this example, a user executes a collaboration client application 202 on a client computing device 204. The user uses the collaboration client application to connect to a collaboration server application 206 executing on a server computing device 208, and to participate as a presenter in a collaboration session hosted by the collaboration server application (Stage 1). The collaboration server application causes the collaboration client application to display a presenter's desktop on the client computing device which allows the presenter to participate as a presenter in the collaboration session. The presenter's desktop may also allow the presenter to display a PIP view of what a typical attendee in the collaboration session would be visually experiencing. When the presenter requests the PIP view, a pseudo client component 210 on the client computing device begins to execute and establishes a new connection to the collaboration server application and participates as an attendee in the collaboration session (Stage 2). In one embodiment, the collaboration server application may download the pseudo client component onto the client computing device when the user of the client computing device connects to the collaboration server application as a participant in a collaboration session. In another embodiment, the pseudo client component may be provided on the client computing device, for example, as a component of the collaboration client application.

The new connection between the pseudo client component and the collaboration server application is established or built in the same manner that any other attendees connection would be. The collaboration server application treats the connection with the pseudo client component as a connection to another collaboration client application in the collaboration session, and begins sending the collaboration session metadata to the pseudo client component. The pseudo client component receives the collaboration session metadata from the collaboration server application and renders the metadata into its own window, such as a PIP view window, on the client computing device's display device to allow the presenter to see what a typical attendee in the meeting is able to see and do. In general terms, the pseudo client component is application specific and functions as a miniature viewer console for the application—i.e., mimics the processing that would occur on the attendee console. In this example, the pseudo client component comprises logic to process the metadata as if the processing was being performed by a collaboration client application executing on an attendee's computing device. For example, the received metadata may include a command to remove a certain privilege, such as a privilege to view slides, which is currently being granted to the attendees in the collaboration session. In this instance, the pseudo client component may remove the panels and/or subwindows which provided this privilege in the displayed PIP view window. In another example, the received metadata may include a command to display a certain slide in a presentation. In this instance, the pseudo client component may display the specified slide in an appropriate panel or subwindow in the displayed PIP view window. Alternatively, the pseudo client component may display an indication that the specified slide is being displayed in the appropriate panel or subwindow in the displayed PIP view window. In still another example, the received metadata may include one or more "tiles" from the presenter's display screen and information in regards to where to position the tiles on the attendee's display screen to produce an image on the attendee's display screen that is being produced on the presenter's display screen. In this instance, the pseudo client component may scale the tiles down to a size appropriate for the PIP view window, and render the tiles in the appropriate location in the PIP view window. In this manner, as tile updates are sent from the presenter's desktop to the attendee's through the collaboration server application, the presenter's PIP view window will also be updated just like the attendee's desktop.

Figure 3:
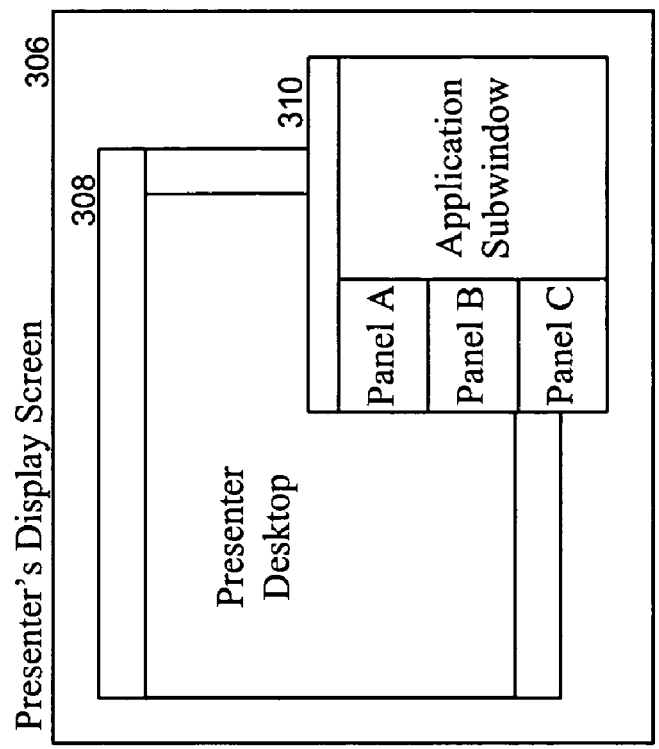
FIG. 3 is a display diagram illustrating a sample presenter's display screen displaying a PIP view window, according to one embodiment.
Figure 3:
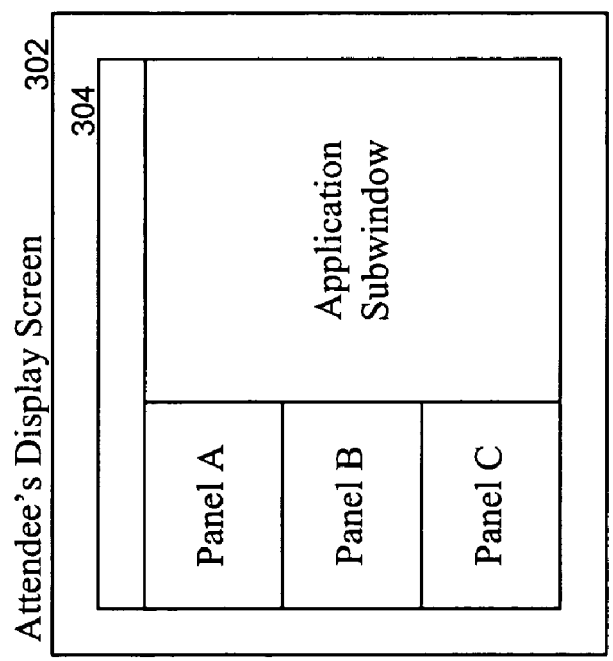

FIG. 3 is a display diagram illustrating a sample presenter's display screen displaying a PIP view window, according to one embodiment. An attendee's display screen 302 is shown displaying an attendee desktop 304, and a presenter's display screen 306 is shown displaying a presenter desktop 308 and a PIP view window 310. The collaboration server application may be providing the attendee desktop to an actual attendee in the collaboration session. As depicted, the attendee desktop is a window that includes three panels, "A," "B," and "C," and an application subwindow. In this instance, the pseudo client component may display on the presenter's display screen the PIP view window that includes a representation of the three panels, "A," "B," and "C," and the application subwindow that is being currently displayed on the attendee desktop. As such, the PIP view window is a representation of the attendee desktop. In some embodiments, the PIP view window may be collapsed, expanded, resized, relocated to a different area of the display screen, etc., by, for example, the presenter.

In one embodiment, the pseudo client component may scale the PIP view window and the data that is displayed in the PIP view window to a smaller size. In other embodiments, the pseudo client component may "anchor" the PIP view window in another window, such as, one of the windows in the presenter's desktop, on the display device. In still other embodiments, the pseudo client component may display a representation of the data in the PIP view window. For example, the representation may be a visual indication that data is being displayed in one or more panels or subwindows in the PIP view window. In yet other embodiments, the pseudo client component may summarize the data and display the summary in the PIP view window. For example, the pseudo client component may display "snippets" of the data in one or more panels or subwindows in the PIP view window.

Figure 4:
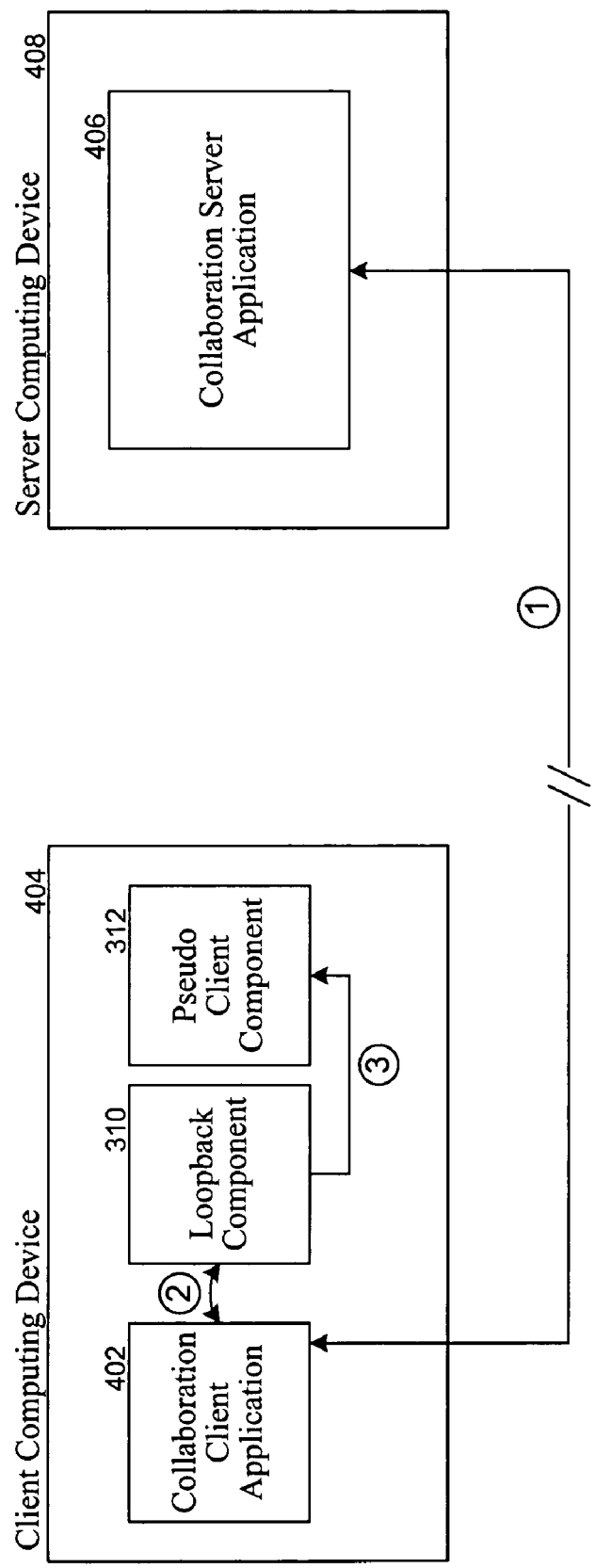
FIG. 4 is a block diagram illustrating an example flow of information between a collaboration client application, a loopback component, a pseudo client component, and a collaboration server application, according to one embodiment.

FIG. 4 is a block diagram illustrating an example flow of information between a collaboration client application, a loopback component, a pseudo client component, and a collaboration server application, according to one embodiment. In this example, a user executes a collaboration client application 402 on a client computing device 404. The user uses the collaboration client application to connect to a collaboration server application 406 executing on a server computing device 408, and to participate as a presenter in a collaboration session hosted by the collaboration server application (Stage 1). The collaboration server application causes the collaboration client application to display a presenter's desktop on the client computing device which allows the presenter to participate as a presenter in the collaboration session. The presenter's desktop may also allow the presenter to display a PIP view of what a typical attendee in the collaboration session would be visually experiencing. When the presenter requests the PIP view, a loopback component 310 and a pseudo client component 312 start executing on the client computing device. The loopback component is application specific, and comprises logic to detect events going from the collaboration client application to the collaboration server application, and to "intercept" the events in a non-intrusive manner. For example, the loopback component may listen in on the transport module of the collaboration client application. The loopback component copies each event (Stage 2) and sends it to the pseudo client component (Stage 3). In one embodiment, the collaboration server application may download the loopback component and/or the pseudo client component onto the client computing device when the user of the client computing device connects to the collaboration server application as a participant in a collaboration session. In another embodiment, the loopback component and/or the pseudo client component may be provided as part of the collaboration client application. Upon receiving the copy of the event, the pseudo client component processes the event and renders a PIP view window on the presenter's display device in a manner similar to that discussed above.

Figure 5:
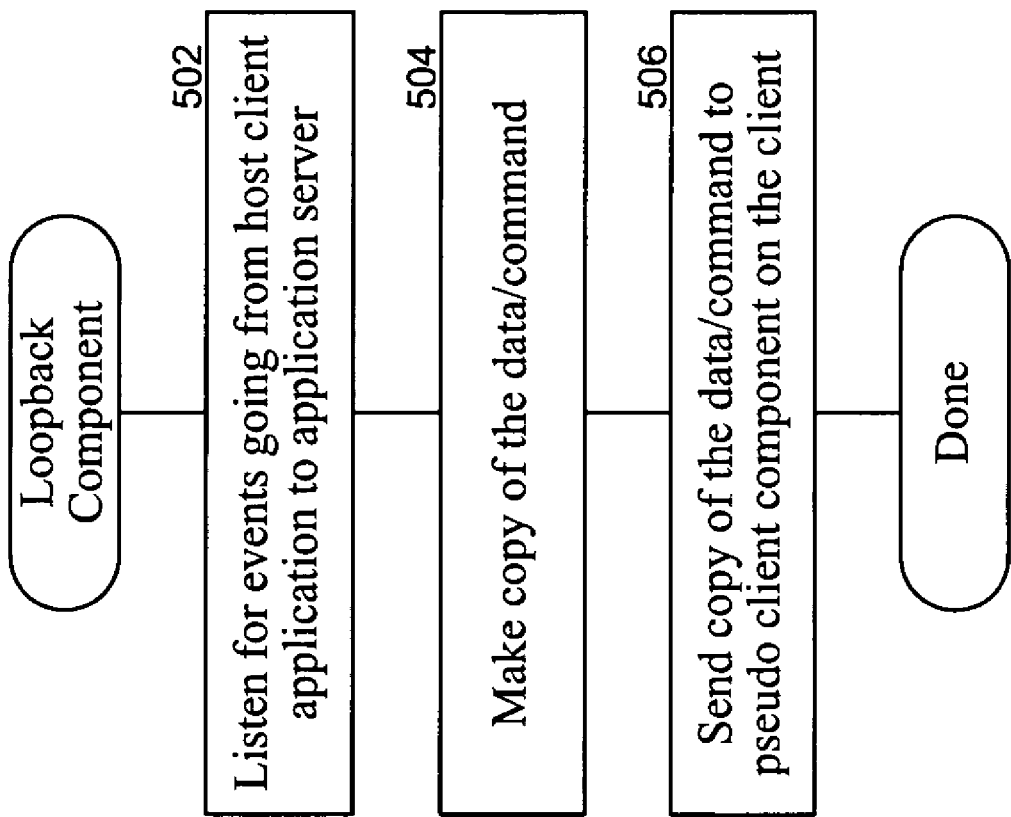
FIG. 5 is a flow diagram illustrating the processing of a loopback component, according to one embodiment.

FIG. 5 is a flow diagram illustrating the processing of a loopback component, according to one embodiment. In block 502, the loopback component executing on the client computing device listens for events going from the collaboration client application to the collaboration server application. The events are application specific, and may include data, metadata, and/or commands. In block 504, the loopback component makes a copy of the data and/or command. For example, if the command is to display a particular page of a document, the loopback component may make a copy of the command as well as the data—i.e., the contents of the specified page of the document. The loopback component may also make a copy of the metadata regarding the document. In block 506, the loopback component sends the detected event—i.e., copy of the data and/or command—to the pseudo client component.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A system of a client computing device for providing a user belonging to a first class of users of an application a view of what a user in another class of users of the same application is visually experiencing, the system comprising:
a memory of the client computing device storing computer-executable instructions that when executed:
establish a first connection to an application executing at a server and display on the client computing device's display screen a first desktop provided by the application,
wherein the first connection allows a user of the client computing device to interact with the application as a member of the first class of users supported by the application,
wherein further the first desktop is provided for use by members of the first class of users; and
in response to a request to display on the client computing device's display screen a view of what a user in a second class of users supported by the application is currently visually experiencing, perform the following:
listen for events going from the client computing device to the application over the first connection;
copy the events going from the client computing device to the application;
process the events as if the processing is occurring on a console of the second class of users' console; and
while displaying the first desktop on the client computing device's display screen, render a view window on the client computing device's display screen based on the processed events, the view window having a representation of a current desktop provided by the application for use by members of the second class of users; and
a processor of the client computing device that executes the computer-executable instructions stored in the memory.

2. The system of claim 1, wherein the second component scales the view window to a smaller size before rendering the view window.

3. The system of claim 1, wherein the view window displays a summary of data that is actually displayed on the desktop provided by the application for use by members of the second class of users.

4. The system of claim 1, wherein the view window displays snippets of data that is actually displayed on the desktop provided by the application for use by members of the second class of users.

5. The system of claim 1, wherein the view window is anchored to the first desktop provided for use by members of the first class of users.

6. A computer-implemented method in a client computing device for providing a user belonging to a first class of application users a view of what a user in another class of users of the same application is visually experiencing, the method comprising:
establishing a connection between a client computing device and an application executing at a server, the connection enables a user to interact with the application as a member of a first class of users supported by the application through a first desktop provided for use by members of the first class of users, wherein the first desktop is displayed on the client computing device's display device;
receiving from the user a request to display a view that represents what a user in a second class of users of the same application is currently seeing; and
in response to the user requesting to display a view that represents what a user in a second class of users of the same application is currently seeing, performing the following:
listening for events going over the connection from the client computing device to the application;
processing the events as if the processing is occurring on the second class of users' console; and
while the first desktop is being displayed, rendering a view window on the client computing device's display screen, wherein the view window is a representation of a current desktop provided by the application for use by members of the second class of users.

7. The method of claim 6, wherein the view window is relocatable on the client computing device's display screen.

8. The method of claim 6, wherein the view window is resizable.

9. The method of claim 6, wherein the view window is scaled to a smaller size.

10. The method of claim 6, wherein the view window displays a summary of data that is actually displayed on the desktop provided by the application for use by members of the second class of users.

11. The method of claim 6, wherein the view window displays snippets of data that is actually displayed on the desktop provided by the application for use by members of the second class of users.

12. A computer-readable storage device comprising instructions which when executed cause a client application executing on a client device to provide a view of what a user in another class of users of an application executing on a server is visually experiencing, the application being a collaborative application, by:
establishing a connection between the client application and the application, the connection allows a user of the client application to interact with the application as a member of a first class of users supported by the application during a collaboration session, the user interacts with first content of the collaboration session using a first desktop that is displayed on the user's display screen, the first desktop displaying the first content of the collaborative session that the first class of users has permission to view;
providing the user an option of having a view of a second desktop of what another user in one of a plurality of classes of users supported by the application is currently visually experiencing during the collaboration session, the second desktop displaying second content of the collaboration session that the another user has permission to view, the first content being different from the second content; and
upon the user requesting to display a view that represents what the another user of the same application is currently seeing, performing the following:
listening for events going over the connection from the client device to the application;
copying the events going from the client device to the application;
processing the copied events as if the processing is occurring on the another users' console; and
while the first desktop is displayed, automatically rendering on the user's display screen a view window that represents what the another user of the same application is currently seeing.

13. The computer-readable storage device of claim 12, wherein the option of having a view of what another user in one of a plurality of classes of users supported by the application is currently visually experiencing is based on access levels.

14. The computer-readable storage device of claim 12 further comprising, upon the user requesting to display a view that represents what a user in a specified one of the plurality of classes of users of the same application is currently seeing, automatically copying events being sent from the client application to the application.

15. The computer-readable storage device of claim 12, wherein the view window is scaled.

16. The computer-readable storage device of claim 12, wherein the view window displays a representation of data that is actually displayed on the desktop provided by the application for use by users supported by the application.

17. The computer-readable storage device of claim 12, wherein the view window does not allow the user to interact with the application.

18. The computer-readable storage device of claim 12, wherein the view window displays an indication of data that is actually displayed on the desktop provided by the application for use by users supported by the application.

* * * * *